(12) United States Patent
Ozawa

(10) Patent No.: US 7,651,112 B2
(45) Date of Patent: Jan. 26, 2010

(54) MOTORCYCLE WITH GRAB BAR ATTACHED TO BODY FRAME BELOW SEAT

(75) Inventor: Toshiaki Ozawa, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 308 days.

(21) Appl. No.: 11/672,881

(22) Filed: Feb. 8, 2007

(65) Prior Publication Data

US 2007/0216132 A1   Sep. 20, 2007

(30) Foreign Application Priority Data

Feb. 10, 2006   (JP)   ............ 2006-033353

(51) Int. Cl.
 *B62K 11/02*   (2006.01)

(52) U.S. Cl. .................... 280/304.5; 180/219

(58) Field of Classification Search ............ 280/304.5; 180/219
See application file for complete search history.

(56) References Cited

U.S. PATENT DOCUMENTS

| 5,094,315 | A   | * | 3/1992  | Taki et al. ............... 180/219 |
| 6,336,579 | B1  | * | 1/2002  | Sako ....................... 224/413 |
| 6,588,529 | B2  | * | 7/2003  | Ishii et al. ............... 180/219 |
| 7,322,725 | B2  | * | 1/2008  | Worakasemsuk et al. .... 362/473 |
| 2002/0007977 | A1 | * | 1/2002 | Ishii et al. ............... 180/219 |
| 2002/0023795 | A1 | * | 2/2002 | Nagai ..................... 180/219 |
| 2007/0023214 | A1 | * | 2/2007 | Ishida et al. .............. 180/68.3 |
| 2007/0089922 | A1 | * | 4/2007 | Iwasaki .................... 180/219 |
| 2007/0230198 | A1 | * | 10/2007 | Ohzono .................... 362/459 |
| 2008/0156562 | A1 | * | 7/2008 | Yano et al. ................ 180/219 |

FOREIGN PATENT DOCUMENTS

JP   2003-127935   5/2003

* cited by examiner

*Primary Examiner*—Lesley Morris
*Assistant Examiner*—Michael R Stabley
(74) *Attorney, Agent, or Firm*—Hogan & Hartson LLP (57) ABSTRACT

A motorcycle having a grab bar with sufficient attachment strength and rigidity, minimum wall thickness and size and no deterioration in external appearance. The grab bar has a grab section to be grabbed by a rider and attachment sections to be attached to left and right seat rails. The attachment sections extend through a space below a rear edge of a seat toward the front and are connected to the left and right seat rails.

19 Claims, 10 Drawing Sheets

MOTORCYCLE WITH GRAB BAR ATTACHED TO BODY FRAME BELOW SEAT

RELATED APPLICATIONS

This application claims the benefit of priority under 35 USC 119 of Japanese patent application no. 2006-033353, filed on Feb. 10, 2006, which application is hereby incorporated by reference in its entirety.

BACKGROUND OF THE INVENTION

1. Field of the Invention

The present invention relates to a motorcycle having a grab bar, and more particularly to an attachment structure for attaching the grab bar to a body frame of the motorcycle.

2. Description of Related Art

Conventional motorcycles have a grab bar disposed at a rear end of a seat and grabbed by a rear seat rider. The rear seat rider applies a push-down force during acceleration and a pull-up force during braking to the grab bar. Therefore, the grab bar must have sufficient attachment strength and rigidity to the body frame. The structure shown in JP-A-2003-127935, for example, has left and right attachment sections that are located at the front ends of left and right grab sections and extend inward in the vehicle width direction. In this structure, the attachment sections are inserted toward the inside through a space between notches of side covers covering the lower regions of the seat and side edges of the seat, and are fixed to the body frame by bolts.

In such a motorcycle, application of a strong force by the rear seat rider to the grab bar in the front-and-rear direction generates a bending force in the front-and-rear direction and a twisting force around an axis extending in the vehicle width direction on the boundary between the attachment sections and the grab sections. Therefore, to provide a grab bar with sufficient attachment strength and rigidity, the size and wall thickness of the attachment sections must be increased, which in turn increases the weight and cost of the motorcycle.

Moreover, in the structure described above, the notches on the side covers, through which the attachment sections are inserted, are visible from the vehicle side and deteriorate the external appearance of the motorcycle.

SUMMARY OF THE INVENTION

The invention solves these problems and provides a motorcycle having a grab bar with sufficient attachment strength and rigidity, but without increased wall thickness and size or a deteriorated external appearance.

A motorcycle according to the invention includes: a body frame; a seat supported by the body frame; side covers for covering left and right lower edges of the seat; and a grab bar provided on the body frame. The grab bar has grab sections to be grabbed by a rider and attachment sections attached to the body frame; and the grab bar extends through a space below a rear edge of the seat toward the front and the attachment sections are connected with the body frame below the seat.

The grab bar may be separated from the body frame and connected to the body frame by bolts or the like, or connected with the body frame into one piece by welding or other methods.

According to the motorcycle of the invention, the attachment sections extending through a space below the rear edge of the seat toward the front are provided on the grab bar, and the attachment sections are fixed to the body frame. Thus, when a force in the front-and-rear direction is applied to the grab bar by the rear seat rider, only a bending force in the front-and-rear direction acts on the attachment sections of the grab bar with no twisting force acting thereon. Accordingly, sufficient attachment strength and rigidity of the grab bar can be secured with the minimum wall thickness and size, and thus the weight and cost of the motorcycle can be reduced.

Moreover, since the attachment sections of the grab bar extending through the space below the rear edge of the seat are connected with the body frame according to the invention, no notch is required on a portion visible from the side of the side covers. Thus, the external appearance is not deteriorated.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIGS. 10($a$) and 10($b$) are cross-sectional views of an attachment of the side cover taken along line Xb-Xb of FIG. 2 and line Xa-Xa of FIG. 3, respectively.

DETAILED DESCRIPTION OF THE INVENTION

An embodiment of the invention is now described with reference to the drawings.

FIGS. 1-9 illustrate a motorcycle according to the invention. The front-and-rear and left-and-right directions in the following description refer to front-and-rear and left-and-right directions from the perspective of a person sitting on the seat of the motorcycle.

The motorcycle comprises a body frame 1 including a head pipe 2 provided at its front end, left and right tank rails 3, 3 extending diagonally downward and rearward from the head pipe 2, left and right rear arm brackets 4, 4 extending downward from the rear ends of the left and right tank rails 3, 3, left and right seat rails 5, 5 extending diagonally upward and rearward from the left and right tank rails 3, 3, and left and right seat stays 6, 6 extending between and connected to the rear portions of the left and right seat rails 5, 5 and the rear arm brackets 4, 4.

A front fork 7 is supported by the head pipe 2 and can be turned to the left and the right. A front wheel 8 is supported by the lower end of the front fork 7, and a steering handle 9 is attached to the upper end of the front fork 7. A front fender 14 for covering the upper region of the front wheel 8 is attached to the front fork 7.

A head light 15 is disposed in front of the head pipe 2. An instrument 16 including a speed meter is provided above the head light 15.

The front end of a rear arm 10 is supported by the left and right rear arm brackets 4, 4 via a pivot shaft 10$a$ to be able to swing upward and downward. A rear wheel 11 is pivotally supported at the rear end of the rear arm 10, and a rear suspension (not shown) is interposed between the rear arm 10 and the rear arm brackets 4.

A fuel tank 12 is provided on the left and right tank rails 3, 3. A tandem seat 13 is equipped on the left and right seat rails 5, 5 behind the fuel tank 12.

A water-cooled four-stroke engine 20 is disposed below the left and right tank rails 3, 3. The engine 20 has a crank case 22 that accommodates a crank shaft 21 that laterally extends in a vehicle width direction. A cylinder block 23, cylinder head 24, and a head cover 25 are stacked on crank case 22 and connected thereto by bolts.

A transmission case 22a that contains a transmission (not shown) is formed integrally with the rear region of the crank case 22. The transmission case 22a has an output shaft 26 that receives the rotation of the engine via the transmission, which in turn rotates the rear wheel 11 via a chain 26a.

An exhaust pipe 27 is connected with the front wall of the cylinder head 24. The exhaust pipe 27 is connected with a muffler 28 that extends below the engine 20 toward the right side of the rear wheel 11. An intake pipe 29 is connected to the rear wall of the cylinder head 24. The intake pipe 29 extends between the left and right tank rails 3, 3 toward the rear and is connected with an air cleaner (not shown). A radiator 30 for keeping the temperature of the engine cooling water at a predetermined value is disposed above the front region of the engine 20.

The front ends of the left and right tank rails 3, 3 and the outside of the radiator 30 are covered by front covers 40, 40 made of resin. The left and right front covers 40, 40 function as air scoops for introducing airflow produced during running of the vehicle into the radiator 30.

The outsides of the left and right seat rails 5, 5 and the seat stays 6, 6 are covered by left and right side covers 38, 38 made of resin. The left and right side covers 38 are divided into front side covers 41 and rear side covers 42.

A rear fender 39 for covering the upper region of the rear wheel 11 is provided on the lower surfaces of the left and right rear side covers 42, 42. The rear fender 39 has a front fender 39a extending to cover the lower regions of the left and right seat stays 6, and a rear fender 39b extending diagonally downward from the rear end of the front fender 39a.

The seat 13 comprises a front seat 13a on which a rider sits and a rear seat 13b on which a rear seat rider sits. Seats 13a and 13b are formed integrally with each other. The front end of the seat 13 is supported by the fuel tank 12 by engagement such that the front end is attachable thereto and detachable therefrom. The rear end of the seat 13 is locked by a cross member 5b connected between the left and right seat rails 5, 5 through a locking mechanism (not shown). The locking mechanism can be released by key-operation of a key cylinder 45 on the rear fender 39b.

The left and right rear side covers 42, 42 extend to cover the spaces between the left and right lower edges 13c of the seat 13 and the seat stays 6, 6 and form a stream line shape in the front-and-rear direction of the vehicle.

An upper edge 42b bended inward in the vehicle width direction and extending in the front-and-rear direction along lower edges 13c of the seat 13 is formed on the upper edge of each of the left and right rear side covers 42, 42. Longitudinal ribs 42c standing upward are provided on the inner edges of the upper edges 42b. The longitudinal ribs 42c are disposed inside the left and right lower edges 13c of the seat 13 in the vehicle width direction, and extend through the entire length of the seat 13 in the front-and-rear direction. The clearances between the lower edges 13c and the upper edges 42b are covered by the longitudinal ribs 42c to prevent entrance of raindrops or the like into the rear side covers 42.

Figure 1:
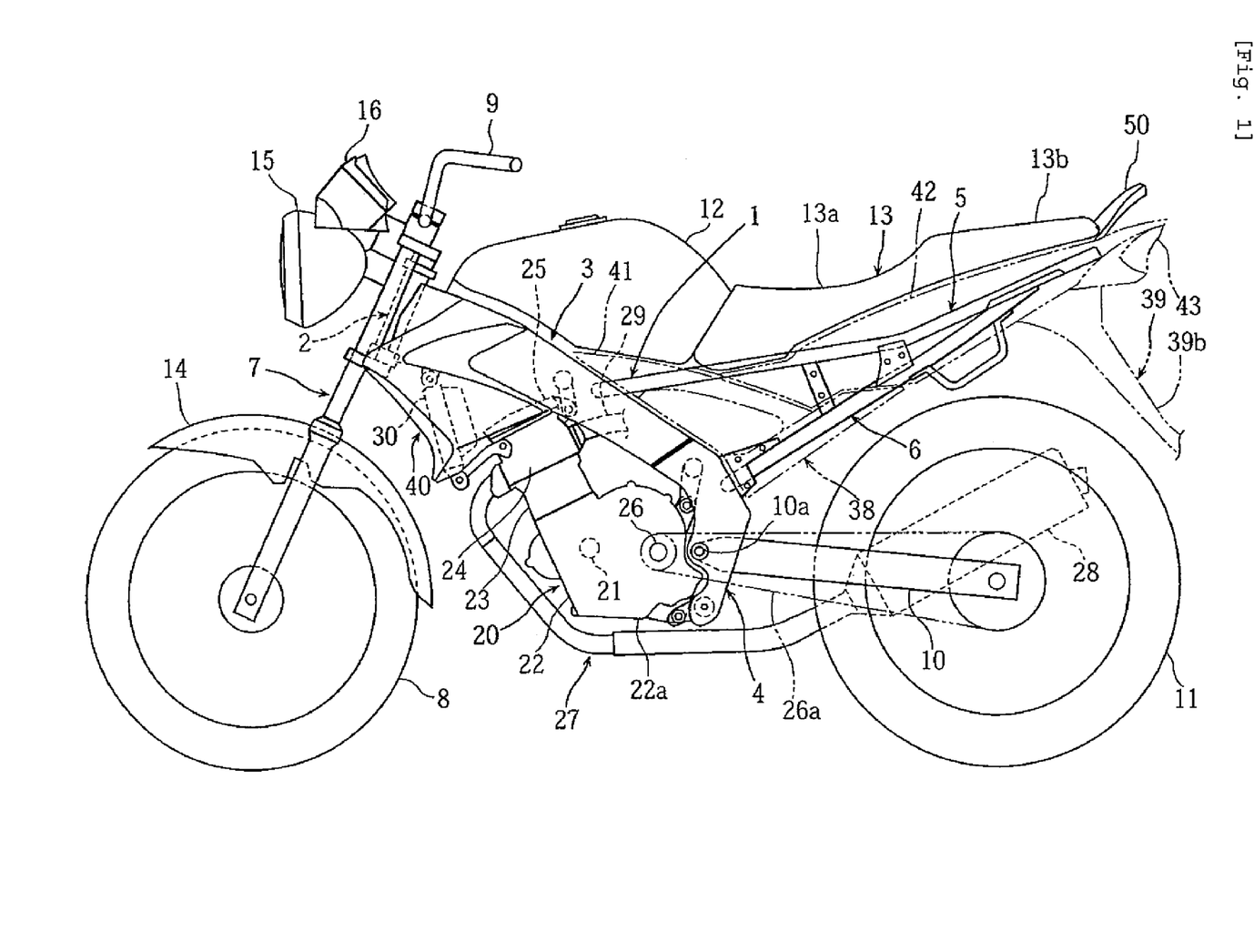
FIG. 1 is a side view of a motorcycle according to the invention.
Figure 2:
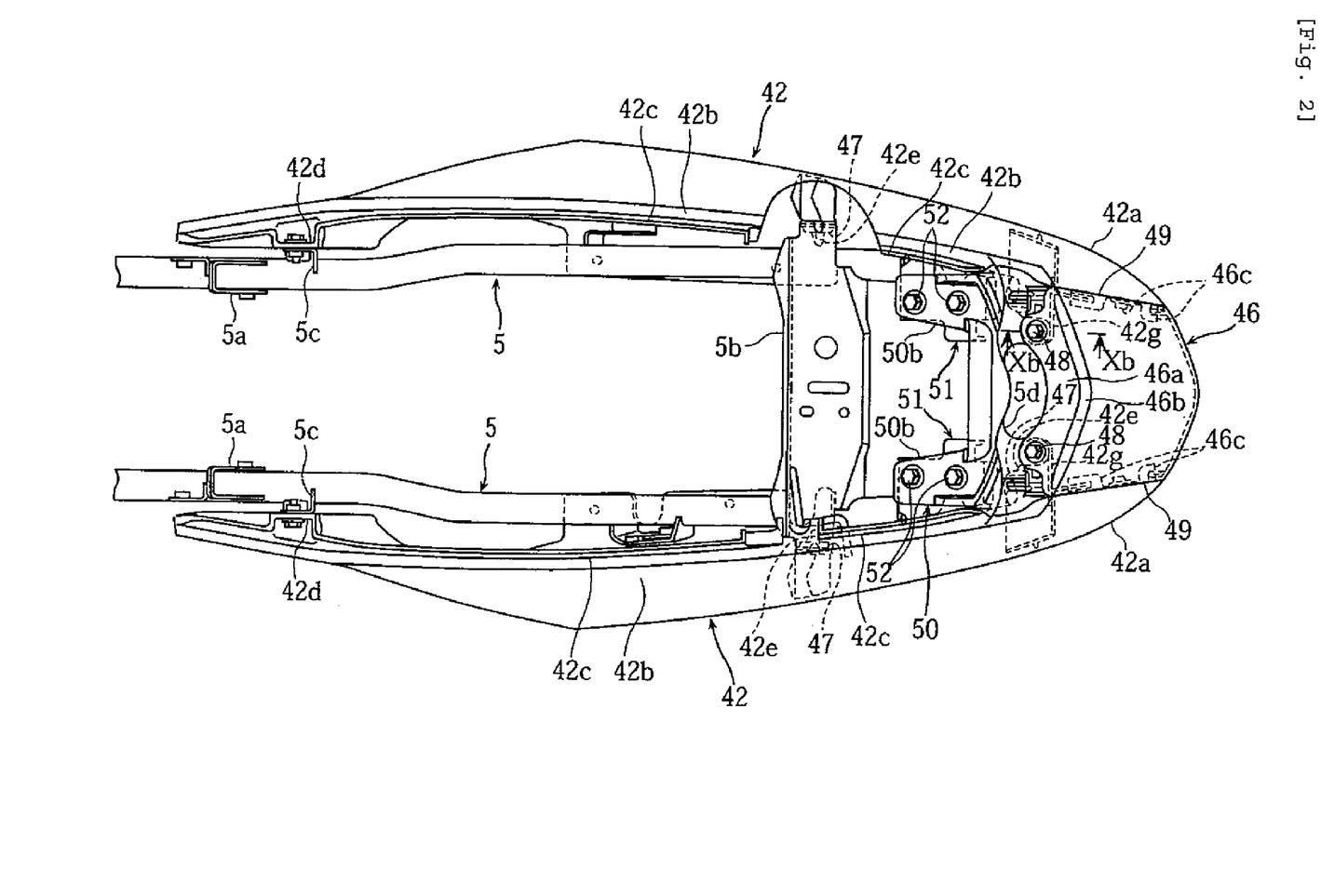
FIG. 2 is a plan view of a body frame of the motorcycle to which left and right side covers are arranged.
Figure 3:
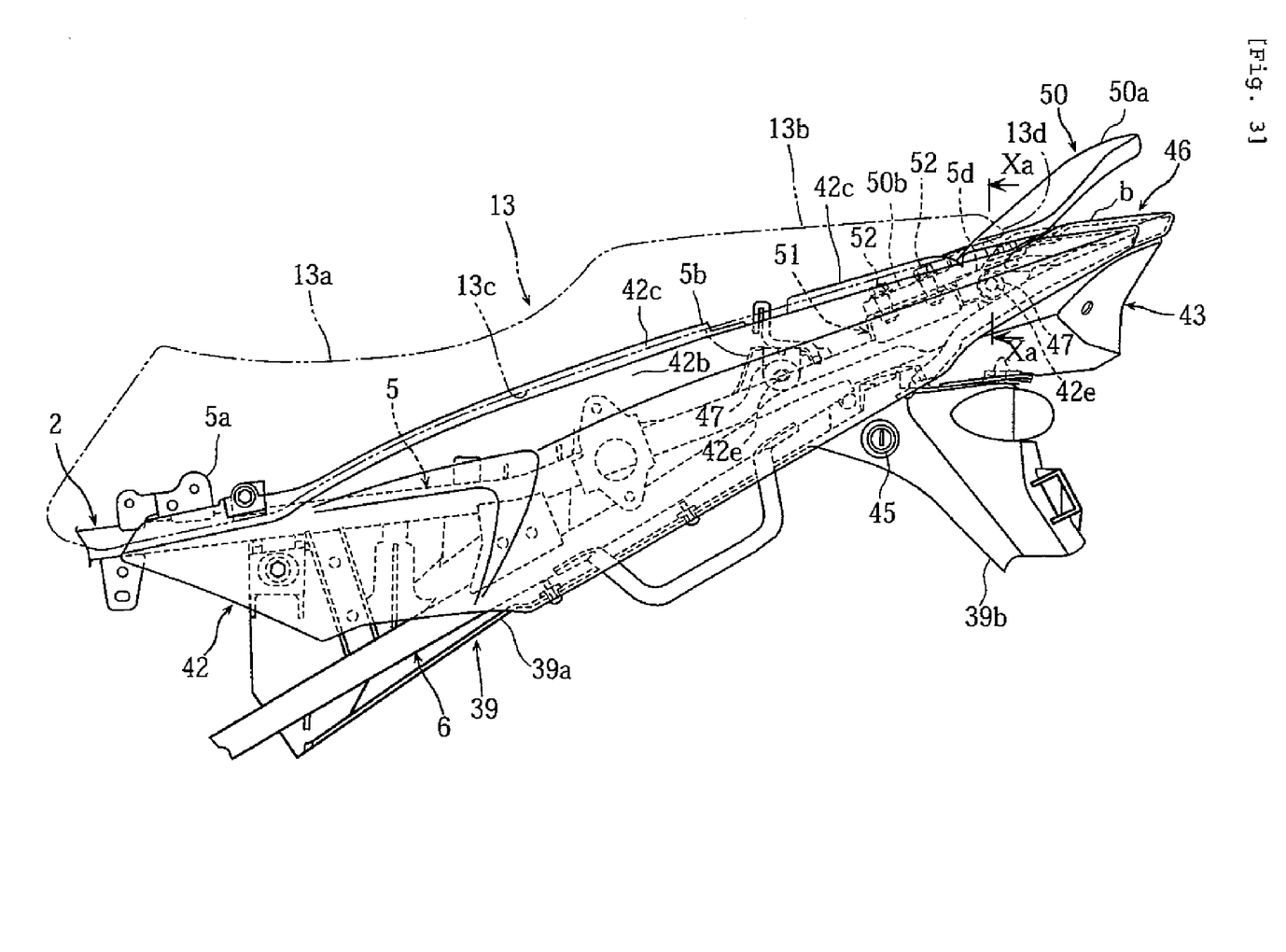
FIG. 3 is a side view of the left and right side covers.
Figure 4:
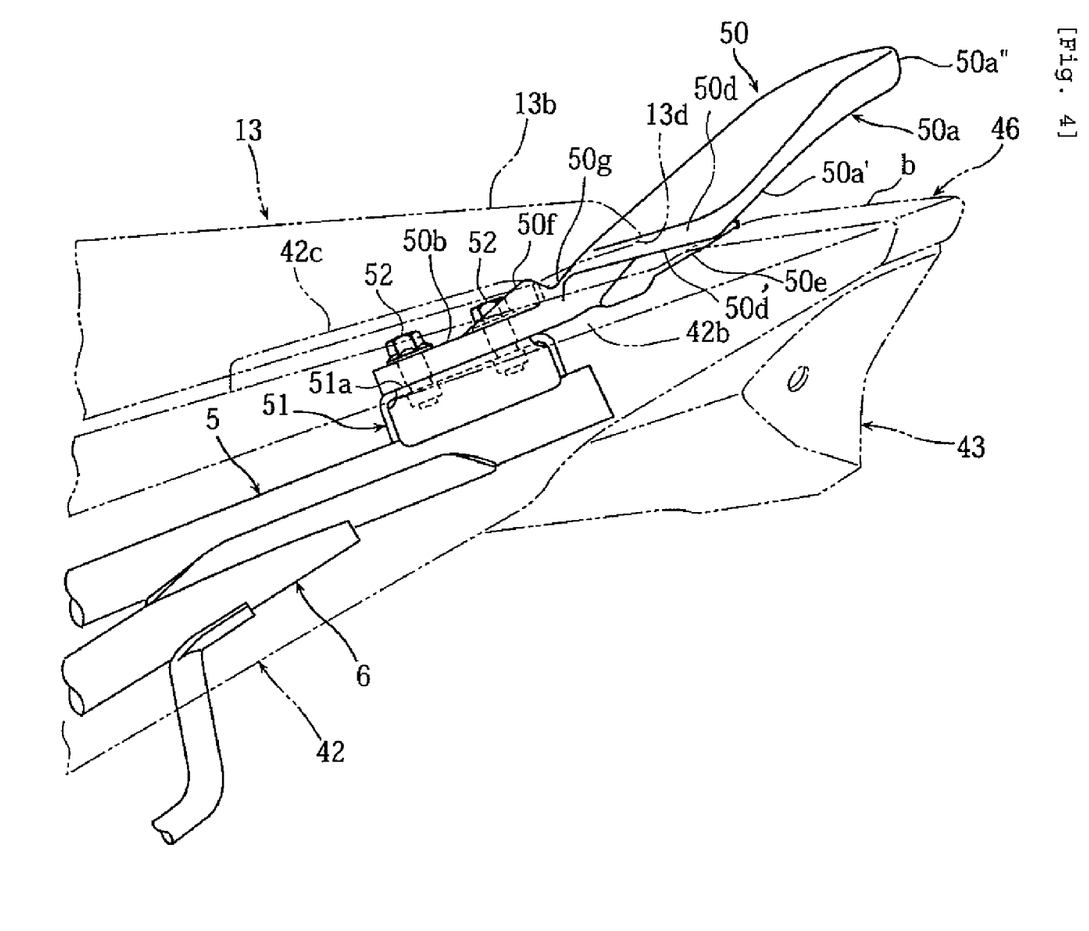
FIG. 4 is a side view of a grab bar connected with the body frame.
Figure 5:
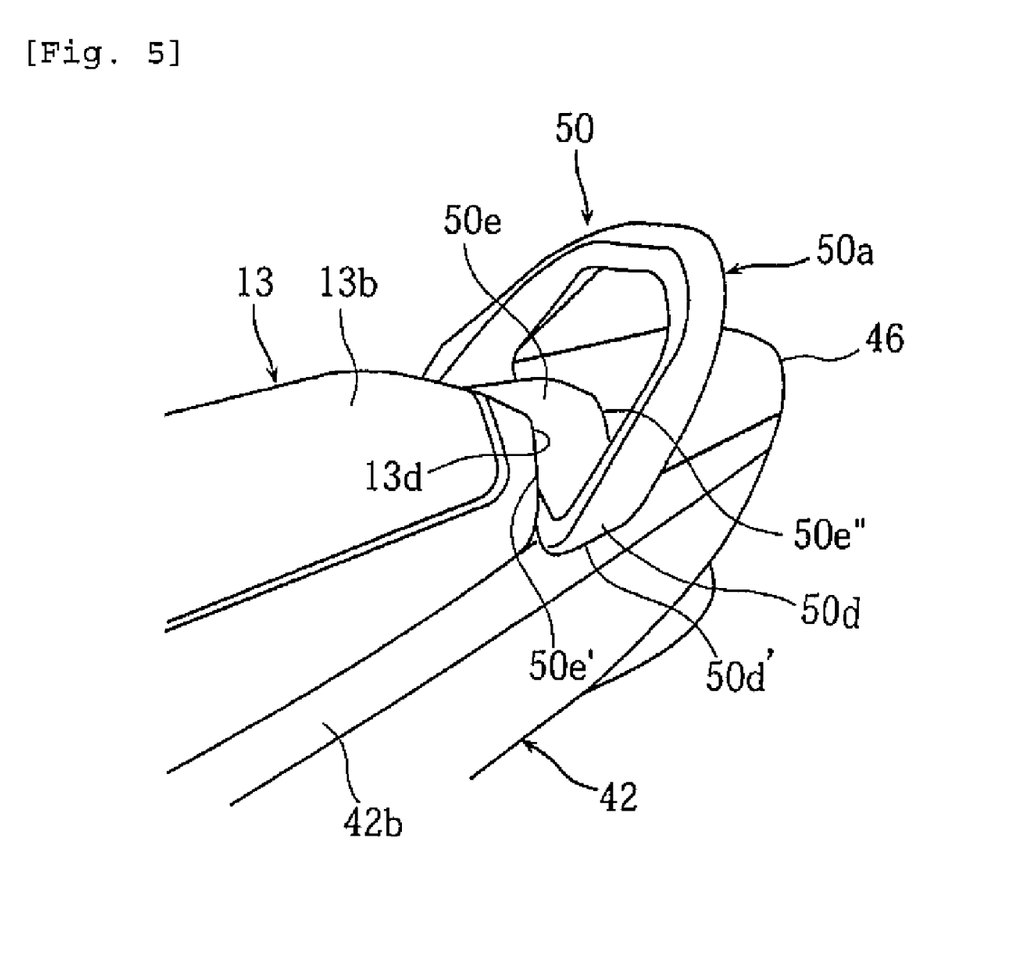
FIG. 5 is a perspective view of the side cover to which the grab bar is arranged.
Figure 6:
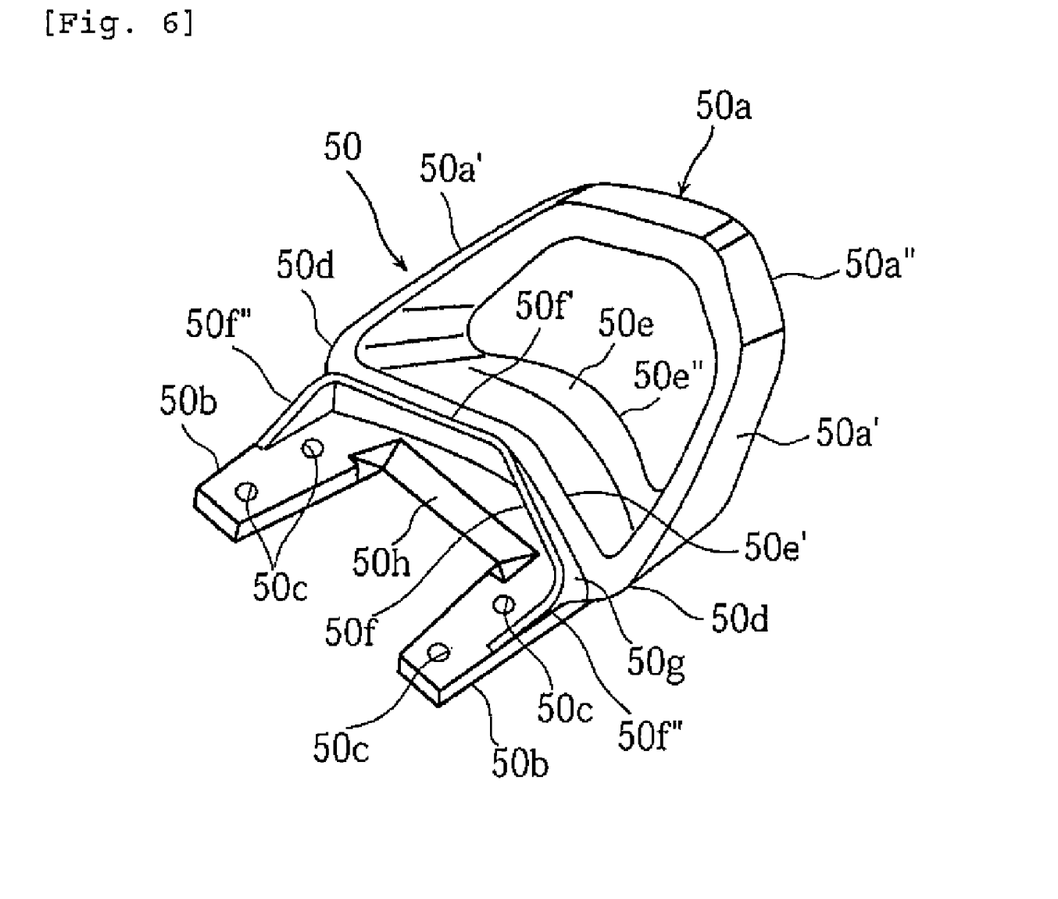
FIG. 6 is a perspective view of the grab bar.
Figure 7:
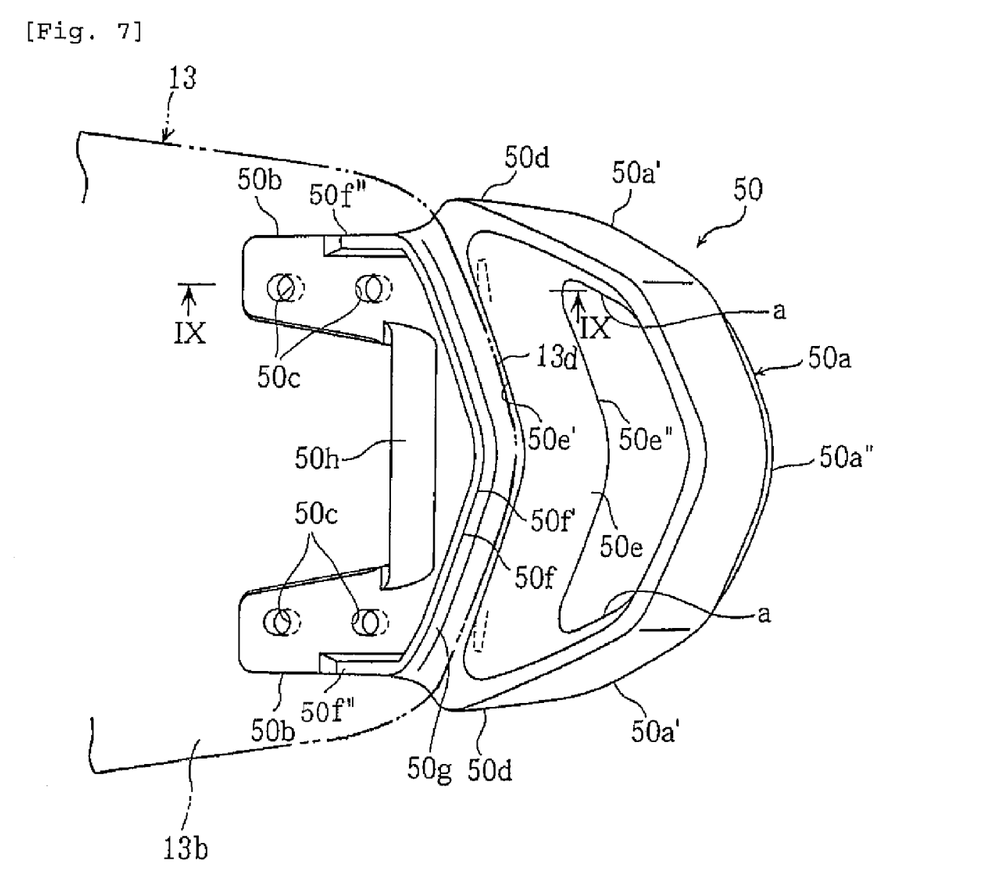
FIG. 7 is a plan view of the grab bar.
Figure 8:
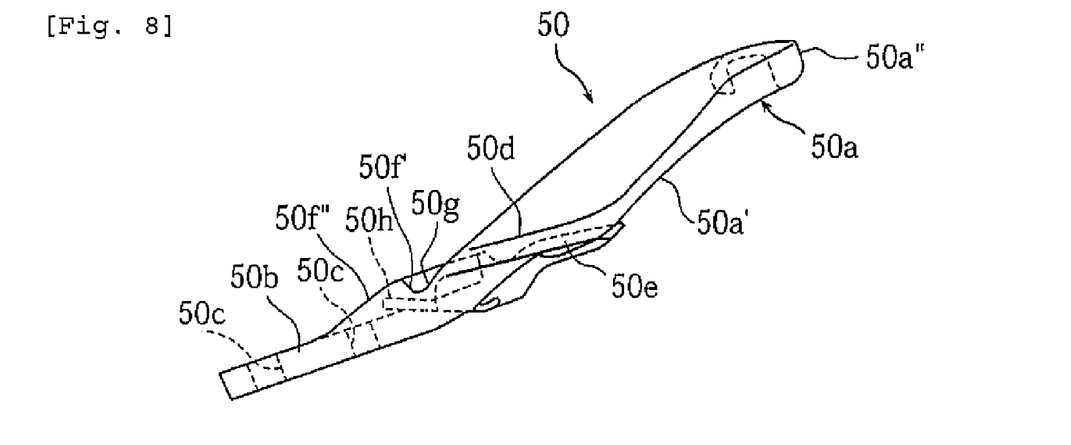
FIG. 8 is a side view of the grab bar.
Figure 9:
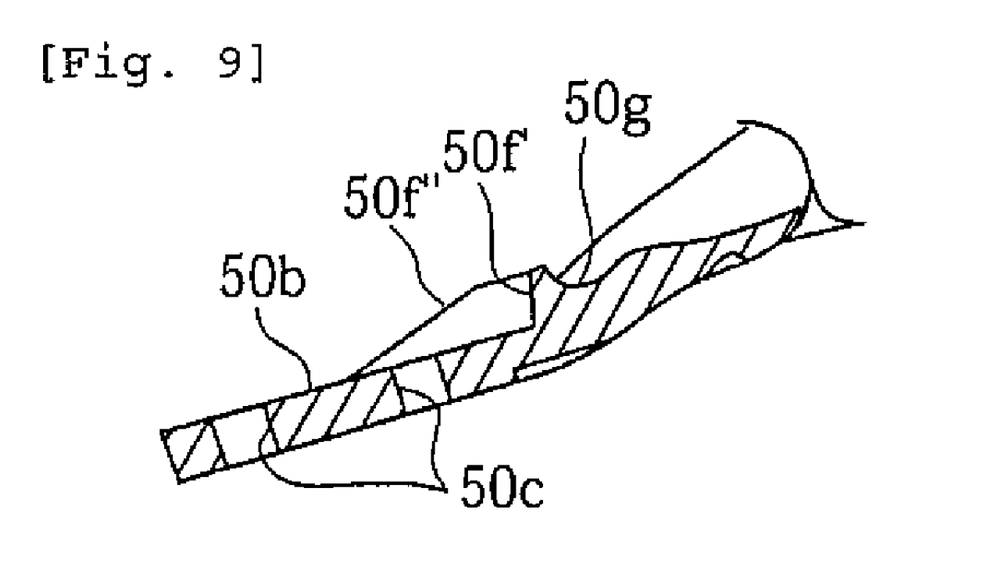
FIG. 9 is a cross-sectional view of the grab bar taken along line IX-IX of FIG. 7.
Figure 10:
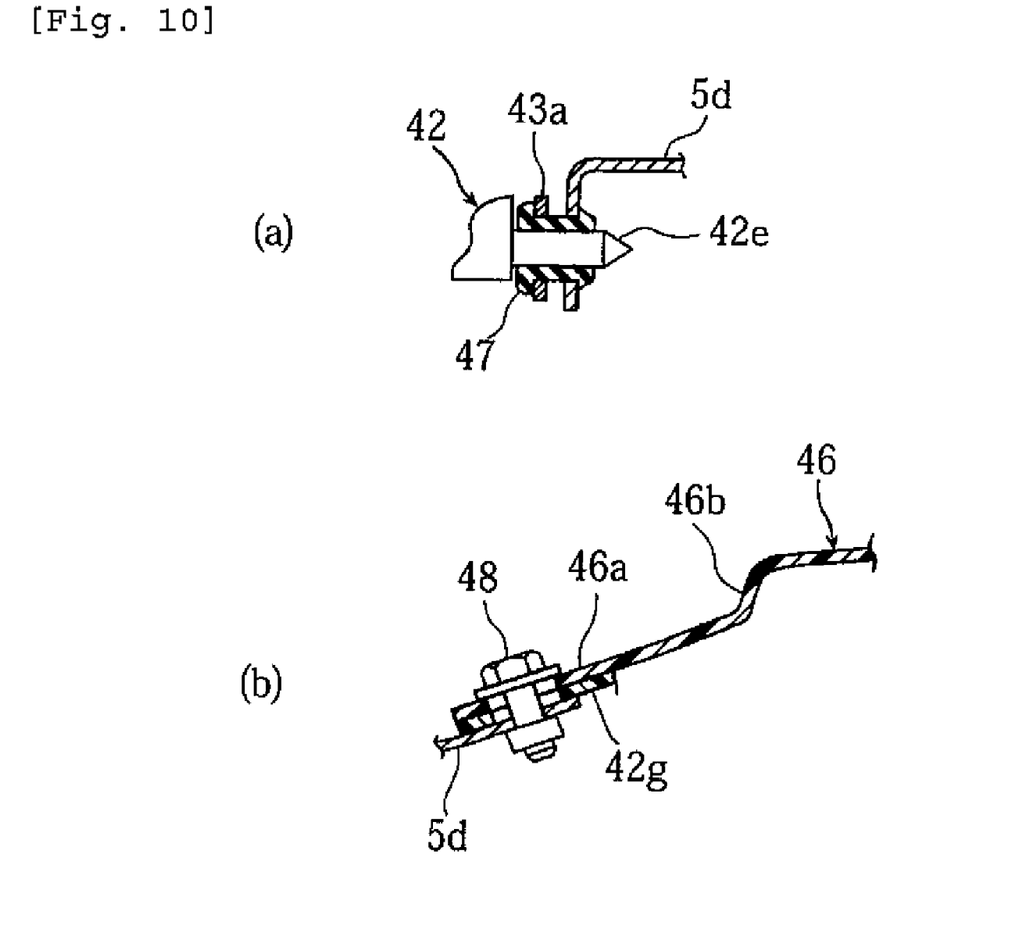

An attachment concave 42d is formed at the front end of each of the left and right rear side covers 42, 42. The attachment concaves 42d are fixed to supporting brackets 5c, 5c connected with the left and right seat rails 5, 5 by bolts. A pair of front and rear projections 42e, 42e disposed leaving a predetermined clearance therebetween and projecting inwardly are formed on the rear region of each of the left and right rear side covers 42, 42. The front projections 42e, 42e are fixed to the cross member 5b by engagement with grommets 47 interposed therebetween. The rear projections 42e are fixed to a tail bracket 5d by engagement with the grommets 47 interposed therebetween. The tail bracket 5d is connected between the rear ends of the left and right seat rails 5, 5. An attachment 43a is an attachment member to a tail light 43 to be described later (see FIG. 10(a)).

Rear ends 42a, 42a of the left and right rear side covers 42, 42 extend behind the rear edge of the seat 13. A rear cover 46 as a part of a rear cover member for connecting the left and right rear ends 42a, 42a is provided between the rear ends 42a, 42a. The rear cover 46 covers the upper surface of the vehicle body behind the seat 13, and the rear cover 46 and the left and right rear ends 42a, 42a form a substantially continuous surface.

The tail light 43 is disposed within an open space formed by the left and right rear ends 42a, 42a, the rear cover 46, and the rear fender 39b.

Attachment flanges 42g, 42g are formed on the left and right rear ends 42a, 42a near the seat rear end. The attachment flanges 42g, 42g form steps projecting downward from the rear ends 42a, 42a and extend inward in the vehicle width direction.

A front flange 46a is formed at the front edge of the rear cover 46. The front flange 46a forms a downward step 46b projecting downward from the front edge of the rear cover 46 and extends toward the front of the vehicle in such a manner as to overlap with the upper surfaces of the left and right attachment flanges 42g, 42g. The left and right ends of the front flange 46a and the left and right attachment flanges 42g, 42g are co-fixed to the tail bracket 5d by left and right bolts 48, 48.

Separating portions 49 by which the rear cover 46 is separated from the left and right ends 42a form a continuous surface. The rear cover 46 is fixed to the side covers 42 by the engagement between ribs 46c of the rear cover 46 and holes of the rear ends 42a.

A grab bar 50 made of aluminum alloy to be grabbed by the rear seat rider is provided at the rear end of the seat 13 such that the grab bar 50 can be attached thereto and detached therefrom. Grab bar 50 can be fixed to the body frame by welding or other methods or formed integrally with the body frame.

The grab bar 50 has a grab section main body 50a extending diagonally upward from the rear edge 13d of the seat 13, and substantially rectangular-plate-shaped left and right attachment sections 50b, 50b extending from the left and right front ends of the grab section main body 50a toward the front of the vehicle. Each of the left and right attachment sections 50b, 50b has a pair of front and rear attachment holes 50c, 50c.

In this embodiment, the rear edge 13d of the seat corresponds to an edge at the rear end of the seat 13 extending in the width direction of the motorcycle. The rear edge 13d includes not only an edge parallel with the vehicle width direction but also edges not parallel with this direction, edges having angles, and curved edges, etc.

The left and right attachment sections 50b, 50b are inserted from the downward step 46b of the rear cover 46 through a space below the rear edge 13d of the seat 13 toward the front. Then, the left and right attachment sections 50b, 50b are fixed to upper walls 51a of left and right connection brackets 51, 51 of the body frame by front and rear pairs of connection bolts 52, 52. An opening into which the left and right attachment sections 50b, 50b are inserted is formed by the downward step 46b of the rear cover 46 and the rear edge 13d of the seat 13.

The connection brackets 51, 51 are fixed to the left and right seat rails 5, 5 before the tail bracket 5d. The left and right connection brackets 51, 51 extend in the front-and-rear direction and have a substantially box shape which opens to below. The left and right attachment sections 50b are exposed to above when the seat 13 is removed.

The grab section main body 50a is substantially circular-arc-shaped and has left and right grab sections 50a', 50a' and an upper grab section 50a'' connecting the upper ends of the left and right grab sections 50a', 50a'.

The left and right grab sections 50a', 50a' have expanding sections 50d, 50d expanding outward in the vehicle width direction from the boundaries with the left and right attachment sections 50b, 50b. Lower surfaces 50d' of the left and right expanding sections 50d, 50d extend in the front-and-rear direction substantially in parallel with the upper edges 42b of the rear side covers 42 as viewed from the side of the vehicle.

The expanding sections 50d, 50d are positioned in the vicinity of the outer surfaces of the upper edges 42b of the rear side covers 42 as viewed from above the vehicle, and disposed outside the separating portions 49 for separating the rear side covers 42 from the rear cover 46.

The left and right grab sections 50a', 50a' extend in the vehicle width direction and are connected by a band-plate-shaped connecting section 50e having a width in the front-and-rear direction. The connecting section 50e is inclined downward to the left and right such that its central portion in the vehicle width direction is located at a higher position than the positions of its left and right ends.

A front edge 50e' of the connecting section 50e extends along the rear edge 13d of the seat 13, and a rear edge 50e'' extends along the front edge of the downward step 46b of the rear cover 46. Thus, only the grab section main body 50a and the connecting section 50e are exposed to the outside. The front flange 46a of the rear cover 46 and the left and right bolts 48, 48 are covered by the connecting section 50e.

The rear edge 50e'' of the connecting section 50e in the vehicle front-and-rear direction is positioned in the vicinity of the cross points of grab section lines 'a' (see FIG. 7) as first lines corresponding to inner edges of the left and right grab sections 50a', 50a' in the plan view as viewed from the side of the vehicle and a cover line 'b' (see FIGS. 3 and 4) as a second line corresponding to the upper edge of the rear cover 46 as viewed from the side of the vehicle.

A projecting section 50f for connecting the left and right attachment sections 50b, 50b is formed at the front edge of the connecting section 50e. The projecting section 50f has a rib shape standing upward, and extends through the entire length of the connecting section 50e in the vehicle width direction.

The projecting section 50f has a lateral projecting section 50f' extending toward the outer edges of the left and right attachment sections 50b, 50b, and front projecting sections 50f'', 50f'' extending from the left and right outer ends of the lateral projecting section 50f' toward the front along the outer edges of the left and right attachment sections 50b, 50b. A groove 50g inclined downward to the left and right from its central portion in the vehicle width direction is formed between the projecting section 50f and the connecting section 50e.

The left and right front projecting sections 50f'', 50f'' of the projecting section 50f are connected with the longitudinal ribs 42c of the left and right rear side covers 42, 42 in such a manner as to form continuous surfaces. Thus, raindrops flow along the groove 50g positioned behind the projecting section 50f to the left and right, and are discharged to the outside surfaces of the rear side covers 42.

The projecting section 50f is positioned before the rear edge 13d of the seat 13 with respect to the vehicle, and is invisible below the seat 13. A seat supporting member 50h having a substantially horizontal surface is provided before the projecting section 50f. The bottom plate of the seat 13 contacts the seat supporting member 50h.

In this embodiment, the left and right attachment sections 50b, 50b extending from the left and right grab sections 50a', 50a' through the space below the rear edge 13d of the seat 13 toward the front are provided on the grab bar 50, and are fixed to the connection brackets 51, 51 of the left and right seat rails 5, 5 by the connection bolts 52, 52. Thus, when a force in the front-and-rear direction is applied to the grab bar 50 by the rear seat rider, only a bending force in the front-and-rear direction acts on the left and right attachment sections 50b, 50b of the grab bar 50 with no twisting force acting thereon. Accordingly, sufficient attachment strength and rigidity is secured without a considerable increase in the wall thickness and size of the left and right attachment sections 50b, 50b. Thus the weight and cost of the motorcycle is reduced.

In this embodiment, the left and right attachment sections 50b, 50b are inserted from the downward step 46b of the rear cover 46 through the space below the rear edge 13d of the seat 13 toward the front, and are attached to the left and right seat rails 5, 5. Accordingly, no notch is required on the rear side covers 42 and the rear cover 46, and the external appearance is not deteriorated.

Since the expanding sections 50d, 50d expanding outward in the vehicle width direction are provided on the boundaries between the left and right grab sections 50a', 50a' and the left and right attachment sections 50b, 50b, the space between the left and right grab sections 50a', 50a' in the vehicle width direction can be widened. Accordingly, the rear seat rider can easily grab the grab bar and can maintain a stable riding position.

Since the left and right attachment flanges 42g of the rear side covers 42 are covered by the left and right expanding sections 50d, 50d from above, deterioration of the external appearance caused by the visibility of the attachment flanges 42g is avoided.

Since the lower surfaces 50d' of the left and right expanding sections 50d, 50d extend in parallel with the upper edges 42b of the rear side covers 42 as viewed from the side of the vehicle, the appearance is enhanced as viewed from the side of the vehicle.

The left and right grab sections 50a', 50a' are connected by the band-plate-shaped connecting section 50e at the boundaries with the left and right attachment members 50b, 50b. The front edge 50e' of the connecting section 50e extends along the rear edge 13d of the seat 13. The rear edge 50e'' extends along the front edge of the downward step 46b of the rear cover 46. Accordingly, the connecting section 50e functions as an external component continuing from the rear edge of the seat 13 to the rear cover 46, and thus the external appearance is enhanced.

In this embodiment, the projecting section 50f connecting with the longitudinal ribs 42c of the left and right rear side covers 42, 42 is formed on the connecting section 50e. Accordingly, raindrops are discharged through the projecting section 50f to the outer surfaces of the rear side covers 42, and thus entrance of raindrops into the space below the seat 13 within the rear side covers 42 is prevented.

Since the projecting section 50f connects the left and right attachment sections 50b, 50b and extends through the entire length in the vehicle width direction, rigidity against a twisting force applied from the grab section main body 50a to the left and right attachment sections 50b, 50b is increased.

Since the projecting section 50f is positioned before the rear edge 13d of the seat 13 with respect to the vehicle, the projecting section 50f is invisible below the seat 13. Accordingly, even if dirt remains after raindrops or the like having flowed along the projecting section 50f are dried, the external appearance is not deteriorated since the dirt is covered by the seat 13.

In this embodiment, the rear ends 42a, 42a of the left and right rear side covers 42, 42 are connected by the rear cover 46 in such a manner as to form a continuous surface, and the rear edge 50e'' of the connecting section 50e of the grab bar 50 in the vehicle front-and-rear direction is positioned in the vicinity of the cross points of the grab section lines 'a' corresponding to inner edges of the left and right grab sections 50a', 50a' in the plan view as viewed from the side of the vehicle and the cover line 'b' corresponding to the upper edge of the rear cover 46 as viewed from the side of the vehicle. Accordingly, no notch or the like for attaching the grab bar 50 to the rear side covers 42 and the rear cover 46 is required, and thus the external appearance is not deteriorated.

The particular embodiments of the invention described in this document should be considered illustrative, rather than restrictive. Modification to the described embodiments may be made without departing from the spirit of the invention as defined by the following claims.

The invention claimed is:

1. A motorcycle, comprising:
a body frame comprising at least two frame members spaced apart in a vehicle width direction;
a seat supported by the body frame;
side covers for covering left and right lower edges of the seat; and
a grab bar provided on the body frame, wherein:
the grab bar has grab sections to be grabbed by a rider and at least two attachment sections spaced apart in the vehicle width direction and attached to the body frame; and
the attachment sections extending forward in a lengthwise direction from the grab sections through a space directly under the seat to be connected with the frame members of the body frame under the seat, the grab bar extending through the space directly under the seat.

2. A motorcycle according to claim 1, wherein the grab sections have expanding sections expanding outward in a vehicle width direction from the attachment sections behind the seat.

3. A motorcycle according to claim 2, wherein lower surfaces of the expanding sections extend in a front-and-rear direction substantially in parallel with upper edges of the side covers.

4. A motorcycle according to claim 1, wherein:
the motorcycle includes a rear cover member extending in a vehicle width direction at a rear end of the motorcycle and covering an upper surface of the motorcycle behind the seat;
the grab sections of the grab bar are a pair of left and right components;
the grab sections are connected by a connecting section at boundaries with the attachment sections; and
a rear edge of the connecting section in a vehicle front-and-rear direction is positioned in a vicinity of cross points of first lines corresponding to inner edges of the grab sections in a side view and a second line corresponding to an upper edge of the rear cover member in a side view.

5. A motorcycle according to claim 1, wherein the grab bar and the body frame are separate pieces.

6. A motorcycle according to claim 5, wherein the grab bar is connected to the body frame by bolts.

7. A motorcycle according to claim 1, wherein the grab bar and the body frame are one piece.

8. A motorcycle according to claim 7, wherein the grab bar is connected to the body frame by welding.

9. A motorcycle, comprising:
a body frame;
a seat supported by the body frame;
side covers for covering left and right lower edges of the seat; and
a grab bar provided on the body frame, wherein:
the grab bar has grab sections to be grabbed by a rider and attachment sections attached to the body frame;
the grab bar extends through a space below the rear edge of the seat toward the front and the attachment sections are connected with the body frame below the seat;
longitudinal ribs positioned inside the left and right edges of the seat in a vehicle width direction and extending in a vehicle front-and-rear direction are provided at upper edges of the side covers; and
a projecting section connected with the longitudinal ribs is provided on the grab bar.

10. A motorcycle according to claim 9, wherein the projecting section extends through substantially an entire length of the grab bar in the vehicle width direction.

11. A motorcycle according to claim 9, wherein:
the attachment sections of the grab bar attached to the body frame are a pair of left and right components; and
the projecting section extends to connect the left and right attachment sections.

12. A motorcycle according to claim 9, wherein the projecting section is positioned before a rear edge of the seat with respect to the motorcycle.

13. A grab bar for a motorcycle, comprising:
grab sections to be grabbed by a rider; and
two attachment sections to be attached to a body frame of a motorcycle, wherein
the attachment sections are configured to extend forward in a lengthwise direction from the grab sections through a space directly below a seat, the grab bar extending through the space directly under the seat,
the attachment sections are configured to connect with the body frame below the seat, and
the attachment sections are spaced apart in a vehicle width direction when attached to the body frame.

14. A grab bar according to claim 13, wherein the grab sections have expanding sections expanding outward in a width direction from the attachment sections.

15. A motorcycle comprising the grab bar of claim 13.

16. A grab bar for a motorcycle, comprising:
grab sections to be grabbed by a rider;
attachment sections to be attached to a body frame of a motorcycle; and a projecting section configured to connect with longitudinal ribs provided on side covers of the motorcycle, wherein
the grab bar is configured to extend through a space below a rear edge of a seat, and
the attachment sections are configured to connect with the body frame below the seat.

17. A grab bar according to claim 16, wherein the projecting section extends through substantially an entire length of the grab bar in a width direction.

18. A grab bar according to claim 16, wherein:
the attachment sections are a pair of left and right components; and
the projecting section extends to connect the left and right attachment sections.

19. A grab bar according to claim 16, wherein the projecting section is configured to be positioned before a rear edge of the seat.

* * * * *